Patented Oct. 20, 1936

2,057,958

UNITED STATES PATENT OFFICE 2,057,958

COMPOSITION AND METHOD OF SETTING UP VITREOUS ENAMEL SLIPS

Charles J. Kinzie, Niagara Falls, N. Y., assignor to The Titanium Alloy Manufacturing Company, New York, N. Y., a corporation of Maine No Drawing. Application July 6, 1931, Serial No. 549,125

11 Claims. (Cl. 106—36.2)

My invention relates more particularly to improved methods in the preparation of enamel slips for the production of acid resisting enamels by the use of titanium compounds in the making of enamel frits or glasses for use in producing acid resisting vitreous enamel coatings on metal.

Of late years the matter of preparing vitreous enameled articles by the so-called wet process of enameling which would resist the action of fruit acids has become an important subject for research and development, and a very definite demand now exists for such acid resisting or stain proof articles in vitreous enamel on iron.

One of the difficult problems in the application of such enamels has been in obtaining a satisfactory suspension of the enamel particles in the water used as a vehicle in wet milling and later in the aging, spraying, dipping operations.

With the enamels ordinarily in use clay is introduced in percentages varying from 5 to 8% of the weight of enamel glass charged to the mill and no special difficulties are encountered in such enamels.

For the so-called acid resisting or stain proof enamels the composition of the glasses is quite different, and it has been found that the amount of clay used has a considerable effect upon the stain proof properties of the resulting enamelware. It is generally conceded that the clay should be kept as low as possible commensurate with good working properties.

With the acid resisting enamels in use at the present time, enamelers have not been able to reduce the clay to as low an amount as they would prefer for the reason that up to the present time they have not had available a satisfactory material which could be used to replace the clay. Consequently enamels which otherwise might be quite stain proof are not so, due to the high clay content used in the slip to keep its ingredients in suspension.

Furthermore such enamels, even with the high percentage of clay used at the mill, will act differently from the usual enamel, in that if the slip is not treated exactly right the frit particles will settle out into a hard mass which can hardly be dislodged from the bottom of container by ordinary means. Such defects due to unsatisfactory setting up procedures have limited the use of such acid resisting enamels.

In my investigations in connection with the problem of producing satisfactory stain proof enamels, I found that if the clay addition could be entirely eliminated the matter of producing completely stain proof enamels would not be particularly difficult since as the clay used at the mill was increased, the resistance to acids decreased. I found also that it was difficult with more than 3% clay at the mill to produce a satisfactory stain proof surface.

The methods disclosed in my United States Patent No. 1,785,777 of December 23rd, 1930 produce a satisfactory suspension of the milled enamel with a restricted clay content, but it has been found that in some cases these methods are not satisfactory because the sulphates present in the slip sometimes cause a defect known as watermarking. This defect often takes the form of lines in the finished surface which mar the appearance to such an extent as to make another setting-up agent necessary. This water-marking occurs in some cases only and in others the methods of my patent work out very well.

In continued work along this line I have discovered that if the titanium hydroxide or hydrated titanium oxide preferably in gelatinous and flocculent form, was first prepared and the soluble salts washed out and then this wet gelatinous hydrated titanium oxide or titanium hydroxide in flocculent form was used at the mill, the undesired water-marking was overcome, and at the same time it was possible to use somewhat more of the titanium and so further reduce the clay addition. For example, in the methods disclosed in my Patent No. 1,785,777, 0.60% titanium sulphate was about the maximum amount that could be safely used which would result in a content of 0.12% $TiO_2$ as the hydrate; if much more titanium sulphate was used the sulphate content would become excessive and be likely to diminish the luster of the finished enamel coating.

When the titanium is used as a separately prepared hydrated oxide or hydroxide in gelatinous and flocculent form, it is possible to add much greater amounts and thus lower the clay content and so obtain a satisfactory setting up, to wit, an enamel slip of acid resisting enamel which works in the slip much like the ordinary enamels in use. My improved methods are a definite advance in the art and practice of enameling, and produce advantageous and practical results with acid resisting enamel glasses.

In most cases it is advisable to use a small amount of adhesive agent such as gum tragacanth at the mill to produce a strong adhering enamel film which will withstand the operations such as brushing of edges and handling of the dried coating prior to the burning operation.

In practicing my improved methods the following particulars in the procedure should be kept in mind.

For enamels other than white, it is usually advantageous to use about 2% clay at the mill; for white enamels particularly those in which titanium forms a substantial part of the enamel glass composition, the best results as to whiteness are obtained by keeping the clay content low because the clays have a marked effect in discoloring the enamel.

For example, such an enamel may be pure white in absence of clay and of a cream color with 2% clay and with say 4% clay the color might be tan in tone. Therefore in white enamels of this type it is important to keep the clay content as low as is practical for each intended purpose and result desired.

The following example will serve to show how my invention may be practiced.

The following materials are charged to the ball mill for white enamels.

| | Parts by weight |
|---|---|
| Enamel glass (frit) | 100 |
| Enameling clay | 0–3 |
| Hydrated titanium oxide equal to | 0.10 to 0.50 TiO₂ |
| Gum tragacanth solution equal to | 0.010 to 0.030 gum |
| Zirconium oxide | 6.00 |
| Water about | 30 |

If colored enamels are to be produced suitable coloring agents would naturally be added at the mill also. The charge is milled to a suitable fineness and discharged from mill and used in usual way.

The hydrated titanium oxide or titanium hydroxide $Ti(OH)_4$ usually is in paste form, and contains about 7% titanium calculated as $TiO_2$ and 93% $H_2O$. The gum tragacanth solution usually is made up to contain 3% gum and 97% water. In some cases hydrated zirconium hydroxide has been used, but generally this does not produce the good results obtained with hydrated titanium oxide.

The hydrated titanium oxide or titanium hydroxide $Ti(OH)_4$ which I use is sometimes referred to as orthotitanic acid and may be prepared by precipitating the titanium preferably from a cold titanic chloride or titanic sulphate solution by an alkali, preferably ammonium hydroxide, followed by washing out the ammonium chloride or ammonium sulphate by any suitable means, preferably by settling and decantation a sufficient number of times to remove these salts so as to leave the titanium precipitate as a voluminous precipitate comprising a flocculated and gelatinous titanium hydroxide in water suspension containing about 3.20 percent $(Ti(OH)_4)$ equivalent suspended in water.

This material can be used in the enamel slip in several ways.

For example, it can be partially dewatered by filtration, or preferably in a centrifugal machine to form a thick paste containing about 10% $Ti(OH)_4$.

Example A will serve to illustrate the method of using the $Ti(OH)_4$ in form of paste.

| Mill charge | Parts by weight |
|---|---|
| Frit (enamel glass) | 100 |
| Enameling clay | 2 |
| Ti(OH)₄ paste (10% strength) | 3.5 |
| Gum tragacanth paste (3%) | 0.5 |
| Zirconium oxide | 6 |
| Water (about) | 30 |

This charge is milled to suitable fineness and discharged from mill, screened in usual manner and used as in ordinary enameling.

The clay may be varied in amounts; if less clay is used a little more titanium hydroxide and gum will be needed; if more clay is used these additions of titanium hydroxide and gum may be reduced somewhat.

I have found a suitable percentage range as follows:—

| | |
|---|---|
| Clay from | 0–3% |
| Ti(OH)₄ paste—(10% strength) | 1 to 5 parts |
| Gum tragacanth paste (3%) | 0.3 to 1 part |
| Zirconium oxide | 4–10 parts |

The water varies somewhat in relation to amount introduced with the $Ti(OH)_4$ and gum pastes, it being important to use only enough added water for good milling practice. More water may be added if necessary in discharging or screening or prior to application of the coating.

The $Ti(OH)_4$ may also be conveniently used in liquid form, for example, directly from settling tank containing 3.20% $Ti(OH)_4$ and this Example B will serve to illustrate how this modified method may be used.

| | Parts by weight |
|---|---|
| Frit | 100 |
| Clay | 2 |
| Ti(OH)₄ liquid | 11.3 |
| Gum tragacanth (3%) | 0.50 |
| Zirconium oxide | 6.00 |
| Water (about) | 22.0 |

For purposes of convenience in shipping the $Ti(OH)_4$ materials as well as for purposes of simplifying the use of the materials, I prefer to make a thick suspension of the clay, $Ti(OH)_4$ with or without the gum. For example, the following product enables the enameler to introduce the $Ti(OH)_4$ along with the clay and gum, in the form of a slurry which can be poured from container as received; this does away with separate weighing operations as well as eliminating the more or less tedious operation of handling the $Ti(OH)_4$ paste.

This product may be prepared as follows:—

| | Parts by weight |
|---|---|
| Ti(OH)₄ in water suspension containing 3.2% Ti(OH)₄ | 500 |
| Enamelers' clay (preferably) Illinois kaolin | 89 |
| Ribbon gum tragacanth | 0.7 |

This charge is milled a short time, say for one hour, in a suitable ball mill to work up the clay, then the thick fluid is discharged from mill and the resulting product is packed in suitable containers.

This product contains approximately

| | Percent |
|---|---|
| Ti(OH)₄ | 2.72 |
| Clay | 15.06 |
| Gum tragacanth | 0.118 |
| Water | 82.102 |
| | 100.000 |

Example C will serve to illustrate the use of the above product.

| | Parts by weight |
|---|---|
| Frit | 100 |
| Ti(OH)₄+clay, etc. slurry | 13.4 |
| Zirconium oxide | 6 |
| Water—about | 22.0 |

The benefits derived from use of separately prepared $Ti(OH)_4$ which is added at the mill consist mainly in the fact that it is possible to use less clay at the mill, and so permit of production of enamels having greater resistance to acids than would be the case if the usual amounts of clay (5 to 7%) were used.

$Ti(OH)_4$ has the advantage that by its use a satisfactory setting up is produced in the absence of sulphates salts which when used may cause various defects, such as water-marking, etc. Ti(OH)$_4$ also has the further advantage that when it is decomposed incidental to burning on of the enamel the resultant combinations do not lower the resistance to acids. Since Ti(OH)$_4$ is insoluble in alkali it continues to act as a setting-up agent even after standing of water containing enamel slip has caused a solution of alkaline salts from enamel glass. Other hydrated compounds such as aluminum would tend to dissolve and thus lose their beneficial effect.

I claim as my invention:

1. A setting up composition for enamel slips for acid-resisting vitreous enamels on metals comprising acid-resisting glass mill liquor, gelatinous titanium hydroxide in flocculent form (Ti(OH)$_4$), not more than 4% clay and an adhesive.

2. A method of producing vitreous enamel on metals which comprises setting up the enamel slip by adding to the mill liquor gelatinous titanium hydroxide in flocculent form (Ti(OH)$_4$).

3. A method of producing vitreous enamel on metals which comprises setting up the enamel slip by adding to the mill liquor containing not to exceed 3% by weight clay, gelatinous titanium hydroxide in flocculent form (Ti(OH)$_4$).

4. A method of producing vitreous enamel on metals which comprises setting up the enamel slip by adding to the mill liquor containing zirconium oxide, gelatinous titanium hydroxide in flocculent form (Ti(OH)$_4$).

5. A method of producing vitreous enamel on metals which comprises setting up the enamel slip by adding to acid-resisting mill liquor gelatinous titanium hydroxide in flocculent form (Ti(OH)$_4$) and an adhesive.

6. A method of producing vitreous enamel on metals which comprises setting up the enamel slip by adding to acid-resisting mill liquor gelatinous titanium hydroxide in flocculent form (Ti(OH)$_4$) and gum tragacanth.

7. In the setting up of an enamel slip for producing vitreous enamel on metals, the step which consists in adding gelatinous titanium hydroxide in flocculent form (Ti(OH)$_4$) to the charge during milling.

8. In the setting up of an enamel slip for producing vitreous enamel on metals from acid resisting glass mill liquor, the step which consists in adding to said liquor an aqueous compound containing gelatinous titanium hydroxide in flocculent form (Ti(OH)$_4$), clay and an adhesive.

9. In the setting up of an enamel slip for producing vitreous enamel on metals from acid resisting glass mill liquor, the step which consists in adding to said liquor an aqueous compound containing gelatinous titanium hydroxide in flocculent form (Ti(OH)$_4$), clay and gum tragacanth.

10. In the setting up of an enamel slip for producing vitreous enamel on metals from acid resisting glass mill liquor containing zirconium oxide, the step which consists in adding to said liquor an aqueous compound containing gelatinous titanium hydroxide in flocculent form (Ti(OH)$_4$), clay and an adhesive.

11. In the setting up of an enamel slip for producing vitreous enamel on metals, the step which consists in adding gelatinous titanium hydroxide (Ti(OH)$_4$) in paste form and a solution of gum tragacanth to the charge during milling.

CHARLES J. KINZIE.